(12) United States Patent
Yamamoto (10) Patent No.: US 7,564,498 B2
(45) Date of Patent: *Jul. 21, 2009

(54) CAMERA WITH POSITIONING DEVICE USED TO CAPTURE MAGNIFIED AND DEMAGNIFIED IMAGES

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/766,563

(22) Filed: Jun. 21, 2007

(65) Prior Publication Data

US 2007/0248343 A1    Oct. 25, 2007

Related U.S. Application Data

(62) Division of application No. 10/276,161, filed on Nov. 13, 2002, now Pat. No. 7,330,213.

(30) Foreign Application Priority Data

| May 4, 2001 | (JP) | .............................. 2001-107770 |
| May 2, 2002 | (JP) | .............................. 2002-27708 |
| May 2, 2002 | (JP) | .............................. 2002-27709 |
| May 4, 2002 | (JP) | ...................... PCT/JP02/03432 |

(51) Int. Cl.
*H04N 5/232* (2006.01)
*G03B 13/00* (2006.01)
*G03B 11/00* (2006.01)
*G02B 27/02* (2006.01)

(52) U.S. Cl. ........................ 348/357; 396/544; 359/804

(58) Field of Classification Search .................. 348/79, 348/80, 240.3, 335, 357, 374; 396/424, 428, 396/432, 544; 359/363, 368, 379, 380, 384, 359/392, 801–806

See application file for complete search history.

(56) References Cited

U.S. PATENT DOCUMENTS 1,837,704 A  *  12/1931  Dean ........................... 355/75

(Continued)

FOREIGN PATENT DOCUMENTS

| JP | 46-33495 A | * | 10/1971 |
| JP | 47-14770 A | * | 5/1972 |
| JP | 04086721 A | * | 3/1992 |

(Continued)

OTHER PUBLICATIONS

International Search Report dated Jul. 2, 2002.
European Search Report dated Dec. 19, 2008.

*Primary Examiner*—John M Villecco
(74) *Attorney, Agent, or Firm*—Michael Bednarek; Paul, Hastings, Janofsky & Walker LLP (57) ABSTRACT

To provide a camera that is suited to shoot both a demagnified image and a magnified image. The camera includes a housing body 11 containing a CCD 15, and a lens barrel 12. An abutted member 20 having an objective lens 40 therein is engaged with the lens barrel 12 and a rotatable manually-controlled member 30 is fitted around that lens barrel. The abutted member 20 moves back and forth in the direction of an optical axis K in response to the rotation of the manually-controlled member 30. A user can move the abutted member 20 and the objective lens 40 back and forth by controlling the manually-controlled member 30. A magnified image can be photographed with the manually-controlled member 30 at its advanced position while a demagnified image can be photographed with the manually-controlled member 30 at its retracted position. The focal point of the objective lens 40 falls on the center of an end of the abutted member 20 located at the position for shooting a magnified image. The magnified image is photographed with the end of the abutted member 20 abutted against the object.

15 Claims, 4 Drawing Sheets

U.S. PATENT DOCUMENTS

| | | | | |
|---|---|---|---|---|
| 2,112,449 A | * | 3/1938 | Proudfit | 396/428 |
| 2,403,892 A | * | 7/1946 | McFarlane et al. | 396/155 |
| 2,813,456 A | * | 11/1957 | Ostrov | 396/419 |
| 3,385,188 A | * | 5/1968 | Ellman | 396/544 |
| 3,514,206 A | * | 5/1970 | Harvey et al. | 396/419 |
| 3,687,030 A | * | 8/1972 | Dine et al. | 396/544 |
| 3,709,119 A | * | 1/1973 | Van Der Meer | 396/428 |
| 3,836,927 A | * | 9/1974 | Dine et al. | 396/544 |
| 3,891,310 A | | 6/1975 | Hideo et al. | |
| 4,701,039 A | * | 10/1987 | Johnson | 396/429 |
| 4,755,838 A | * | 7/1988 | Lemmey | 396/155 |
| 5,028,941 A | * | 7/1991 | Sohn | 396/544 |
| 5,293,242 A | * | 3/1994 | Mamiya | 348/362 |
| 5,294,948 A | * | 3/1994 | Merkt et al. | 396/544 |
| 5,416,544 A | * | 5/1995 | Stapleton | 396/544 |
| 5,576,781 A | * | 11/1996 | Deleeuw | 396/6 |
| 5,781,807 A | * | 7/1998 | Glassgold et al. | 396/544 |
| 5,833,612 A | * | 11/1998 | Eckhouse et al. | 600/476 |
| 5,950,017 A | * | 9/1999 | Reff | 396/544 |
| 5,960,217 A | * | 9/1999 | Goto | 396/505 |
| 6,052,534 A | * | 4/2000 | Goto | 396/544 |
| 6,072,600 A | * | 6/2000 | Wertsberger | 358/479 |
| 6,798,985 B2 | * | 9/2004 | Reff | 396/544 |
| 7,194,200 B1 | * | 3/2007 | Behlow | 396/544 |
| 2003/0107668 A1 | * | 6/2003 | Yamamoto | 348/357 |
| 2007/0003277 A1 | * | 1/2007 | Stapleton | 396/544 |

FOREIGN PATENT DOCUMENTS

| | | | | |
|---|---|---|---|---|
| JP | 06148527 A | * | 5/1994 | |
| JP | 3007843 A | * | 12/1994 | |
| JP | 09046567 A | * | 2/1997 | |
| JP | 10-142684 | | 5/1998 | |
| JP | 11231384 A | * | 8/1999 | |
| JP | 2003315905 A | * | 11/2003 | |

* cited by examiner

CAMERA WITH POSITIONING DEVICE USED TO CAPTURE MAGNIFIED AND DEMAGNIFIED IMAGES

This application is a division of U.S. patent application Ser. No. 10/276,161 filed Nov. 13, 2002 now U.S. Pat. No. 7,330,213, which is herein incorporated by reference in its entirety.

TECHNICAL FIELD

The present invention relates to a camera that can shoot both demagnified images and magnified images.

BACKGROUND OF THE INVENTION

Typical cameras are configured to direct the light from the object onto image pickup means, such as a film or a CCD, through an objective lens. An image of the object is formed by a certain reaction between the image pickup means and the light from the object.

Images to be photographed are of various types and formats, classified in different ways. A class of images to be photographed categorizes them into demagnified images and magnified images.

The demagnified image refers to a smaller image of a subject/object that is focused onto the image pickup means (e.g., CCD) when the subject/object is larger than the image pickup plane of the image pickup means. Examples include common images of portrait and landscape pictures. On the other hand, the magnified image refers to a larger image of the object that is focused onto the image pickup means (e.g., CCD) when the object is smaller than the image pickup plane of the image pickup means. Examples include close-up shots of, for example, a part of a thin fiber or the texture of the human skin.

As is known, conventional cameras are available for shooting either the demagnified images or magnified images. It is theoretically possible to shoot both demagnified images and magnified images by varying the distance from the objective lens to the image pickup means and the distance from the objective lens to the object, according to a certain relation. Such devices, however, are not yet in practical use.

Possible reasons are as follows.

The area to be photographed for a magnified image is obviously small. This means that shooting a magnified image requires the object to be within that narrow range. This is often difficult to achieve. To cope with this, cameras designed for shooting magnified images usually have a mechanism to fix the relative position between the object and the image pickup means, as can be found in video microscopes. Such a mechanism may be unnecessary when shooting a demagnified image and, if anything, it may be an obstacle in shooting a demagnified image. Thus, cameras designed for shooting demagnified images have different requirements in configuration from those designed for shooting magnified images. Combining the functions to shoot demagnified images and magnified images together into a single camera is not so easy.

Besides the above-mentioned configuration reasons, there is another circumstance that the demagnified images do not share their utility and customers with the magnified images. Shooting both demagnified images and magnified images using a single camera is not in demand, at least up to now.

These situations have delayed the development of a camera that can shoot both demagnified images and magnified images.

However, if it is possible to shoot, for example, a demagnified image of the whole body of a person and a magnified image of a part of his or her skin surface using a single camera, a magnified image of the lesion on the skin and a demagnified image of a full-length portrait with the position of the lesion can be photographed, thereby indicating the condition of a lesion along with the information about where it is in the body. Another example is a magnified image of a surface defect in a product photographed along with an entire picture of that product. The details of a defect can thus be indicated in addition to the position of the defect in a product.

This suggests that cameras available for shooting both the demagnified images and magnified images do not lack their demands. Rather, usefulness of such cameras has not been fully appealed. This means that the cameras that can shoot both of the above-mentioned kinds of images may create an active demand when their utility meets with general acceptance.

In addition, the cameras that can shoot both demagnified images and magnified images may supply entertainment and amusement to users which conventional cameras cannot be achieved. Such cameras with innovative entertainment and amusement are also expected to create additional demands.

The present invention is made with respect to the above circumstances and an object thereof is to provide a camera that is suitable for shooting both demagnified images and magnified images.

DISCLOSURE OF INVENTION

The present invention to solve the above-mentioned problems is as follows.

This camera is based on a camera comprising an objective lens; and image pickup means for building up an image using the light from an object, the light from the object being adapted to be directed to the image pickup means through the objective lens. The objective lens is movable along the optical axis of the light from the object at least between a first range span within which an image built up by the image pickup means is a demagnified image and a second range span within which an image built up by the image pickup means is a magnified image. In addition, it comprises positioning assistance means adapted to be used with an end thereof abutted against the object when the objective lens is located in the second range span, the positioning assistance means contributing to maintaining the distance between the object and the objective lens within the extent to which a focal point of the objective lens falls on the part of the object to be photographed, the positioning assistance means being located outside the field of view of the objective lens in the first range span.

The camera may comprise a housing for holding the objective lens and the image pickup means therein. In such a case, the above-mentioned positioning assistance means is fitted to the housing in such a manner that it comes outside the field of view of the objective lens in the first range span.

As described above, the objective lens in the camera is movable along the optical axis of the light from the object between the first range span within which an image built up by the image pickup means is the demagnified image and the second range span within which an image built up by the image pickup means is the magnified image. Accordingly, the camera can shoot both demagnified images and magnified images.

The camera also comprises positioning assistance means. The positioning assistance means is used with the end thereof abutted against the object when the objective lens is located in the second range span. The positioning assistance means, during the use, contributes to maintaining the distance between the object and the objective lens within the extent to which a focal point of the objective lens falls on the part of the object to be photographed. The positioning assistance means allows the user to shoot a magnified image using this camera while the end of the positioning assistance means is abutted against a point out of the area corresponding to the part of the object to be photographed. Image pickup can thus be performed while holding the camera relatively steady. This reduces the problem that the object leaves the picture area of the camera due to camera shake.

The positioning assistance means contributes to maintaining the distance between the object and the objective lens within the extent to which the focal point of the objective lens falls. This means that the positioning assistance means also has the function of facilitating image pickup while maintaining the focal point of the subject in focus on the object with the end of the positioning assistance means abutted against the object. Shooting an image using a hand-held camera often involves camera shake because the camera is not in contact with the object. Besides, it is difficult to properly focus on the object. On the contrary, the camera according to the present invention reduces the difficulty of the focusing, by allowing the end of the positioning assistance means to be abutted against the object.

Taking the above into consideration, the camera according to the present invention has a chance to prove its merits when it is applied to a hand-held camera.

As described above, a prerequisite for the positioning assistance means according to the present invention is that it can contribute to maintaining the distance between the object and the objective lens within the extent to which the focal point of the objective lens falls on the object.

This may be configured as, for example, a single rod-shaped member projected from the housing of the camera. In such a case, the length of the rod-shaped member along the optical axis thereof should be that the distance between the object and the objective lens is within the extent to which the focal point of the objective lens falls on the part of the object to be photographed when the end of the rod-shaped member is abutted against the subject. In this example, point contact is achieved between the positioning assistance means and the object. Because of the point contact, the camera tends to move pivotally about that end even when the end is contacted with the object. However, image pickup can be made much easier than in the case where the camera is completely away from the object.

The positioning assistance means may be formed of three rod-shaped members. In such a case, though depending on the length of each rod-shaped member, three point support can be achieved at the three points on the end of the positioning assistance means. This provides a fixed distance between the object and the objective lens when the end of the positioning assistance means is brought into contact with a planar object. Accordingly, the positioning assistance means in this case is that has the function of positioning the object lens with respect to the distance from the object so that the distance between the object and the objective lens is unchanged when the end of the positioning assistance means is brought into contact with the planer object. Using such positioning assistance means, abutting the end thereof against the object always causes the objective lens to be in focus on the part of the object to be photographed. This facilitates shooting of demagnified images in a more stable manner. Examples of the positioning assistance means that allows the distance between the object and the objective lens to be unchanged when the end of the positioning assistance means is brought into contact with the planer object include those that can achieve abutment against a certain plane at three or more points, or can achieve contact to a certain plane along a straight line plus at one point or more, or can achieve curved line contact to a certain plane, or can achieve surface contact to a certain plane.

The positioning assistance means in the present invention is located outside the field of view of the objective lens when the object lens is in the first range span. Accordingly, there is no possibility that the positioning assistance means interferes with shooting of a demagnified image when the camera is used as an ordinary camera.

The position of the positioning assistance means may or may not appear in the field of view of the objective lens when the objective lens is in the second range span. The positioning assistance means does not interfere with shooting of a demagnified image when it does not appear in the field of view of the objective lens that is in the second range span and when the end of the positioning assistance means that is abutted against the object is located out of the area corresponding to the part of the object to be photographed. On the other hand, when the positioning assistance means appears in the field of view of the objective lens while the objective lens is in the second range span, the positioning assistance means may interfere with shooting of images. This is particularly remarkable when the end of the positioning assistance means that is abutted against the object is located within the area corresponding to the part of the object to be photographed. However, it is possible to avoid substantial interference by the positioning assistance means with shooting of an image to ensure that the positioning assistance means is abutted against the object only at a small portion of the part of the object to be photographed. This may still provide advantages for use. An example includes a case where the positioning assistance means is abutted against the object only at a small portion near the outer periphery of the part of the object to be photographed. The positioning assistance means may include, at the end thereof, reference means that allows the user to find out the size of the object by comparing the reference means with the object when the end of the positioning assistance means to be abutted against the object is within the area corresponding to the part of the object to be photographed while the objective lens is in the second range span. By providing compared means such as a scale in a place on the end of the positioning assistance means that lies within the area corresponding to the part of the object to be photographed when the end is abutted against the object, the user of the camera can find out an approximate size of the object(s) included in a subject.

The positioning assistance means of the present invention may be fixed to the housing of the camera. Alternatively, the positioning assistance means may be located at different positions when the objective lens is in the first range span and when it is in the second range span. The field of view of the camera is larger when the objective lens is in the first range span. Therefore, the positioning assistance means may be farther away from the field of view of the objective lens when the objective lens is in the first range span for example than when the objective lens is in the second range span. This facilitates preventing the positioning assistance means from appearing in the field of view of the objective lens that is in the first range span.

For example, the positioning assistance means may be contained within the housing while the objective lens is in the first range span. This configuration prevents the positioning assistance means from interfering with shooting of an image even when the objective lens is in the first range span.

As described above, the positioning assistance means may be moved relative to the housing. The positioning assistance means may be moved in any manner. For example, it can be moved while rotating with respect to the housing. Alternatively, it can be moved in parallel to the housing. As described above, the end of the positioning assistance means is abutted against the object when the camera is ready for shooting a magnified image.

In the case where the object is skin of a person and the end of the positioning assistance means is abutted against the skin, rotation of the positioning assistance means may result in uncomfortable feeling of the subjected person. The positioning assistance means that is adapted to move in a straight line does not cause such uncomfortable feeling.

For the positioning assistance means that is configured to move along the optical axis, the direction of movement is perpendicular to the skin. This eliminates uncomfortable feeling of a user during shooting of an image of his or her skin.

The objective lens is a lens facing the object. The objective lens may be a single lens or a combination of two or more lenses. For example, an objective lens having less aberration can be formed of three lenses, i.e., a concave lens, a convex lens, and a concave lens that are arranged in this order.

The objective lens may be movable along the optical axis in the second range span. As described above, the camera of the present invention ensures easier shooting of a magnified image in focus by abutting the end of the positioning assistance means against the object. However, the object may be out of focus when it has irregularities. By allowing the objective lens to move in the second range span, the focal point can be adjusted precisely when the object has irregularities.

The objective lens may also be movable along the optical axis in the first range span.

In addition, the objective lens may be movable along the optical axis both in the first and second range spans.

The objective lens may be moved in any manner. It may be moved manually by using a mechanical mechanism. Alternatively, it may be moved by using driving means such as a motor or an actuator.

Movement of the objective lens may be performed by means of providing manually-controlled member as described below and manually controlling the manually-controlled member. The manually-controlled member may be movable, for example, from a first position to a second position. The objective lens may be configured so that it moves from the first range span to the second range span in response to the movement of the manually-controlled member.

The amount of movement of the objective lens in response to the movement of the manually-controlled member may correspond to the amount of movement of the manually-controlled member. This allows the user to intuitively find out the amount of movement of the objective lens that results in the movement of the manually-controlled member. In addition, the manually-controlled member may be configured so that the amount of movement of the objective lens in response to the movement of it is smaller when the objective lens is inside the first range span and the second range span than when it is outside the first range span and the second range span. The first range span and the second range span are aligned in the order of the first range span, the portion other than the first and second range spans, and the second range span. The amount of movement of the objective lens that is required for the first range span and the second range span is small because the movement is for the purpose of focusing. On the contrary, no image is to be taken in general when the objective lens is outside the first and second range spans. The objective lens should preferably be moved as fast as possible across this region. The above-mentioned relation in amount of movement between the manually-controlled member and the objective lens makes it possible to move the objective lens at a high speed across the region other than the first and second range spans where the object lens should be moved as fast as possible. In addition, the objective lens can be moved precisely and positively in the first and second range spans where it should be.

The objective lens may be fitted to the camera in any manner. For example, the objective lens may be fitted to the positioning assistance means. In this case, the positioning assistance means may be movable in the direction of the optical axis.

As described above, the positioning assistance means may take one of various shapes. For example, the positioning assistance means may be tubular. In this case, the objective lens may be fixed to and contained inside the tubular positioning assistance means. The positioning assistance means in this case may be movable in the axial direction thereof.

The housing of the camera in the present invention may take any one of various shapes. The housing may include, for example, a housing body and a lens barrel that is projected from the housing body. This is a typical appearance of a camera.

When the lens barrel is provided, the above-mentioned positioning assistance means may be fitted to the lens barrel in such a manner that the positioning assistance means is movable in the axial direction of the lens barrel. In this event, the positioning assistance means may be fitted to either an outer portion or an inner portion of the lens barrel. When fitted to the inner portion of the lens barrel, the positioning assistance means is inserted into and engaged with the inner surface of the lens barrel.

For the camera having a lens barrel, the above-mentioned manually-controlled means may be fitted around the lens barrel. The manually-controlled means that is fitted around the lens barrel may be hollow cylindrical in shape. It may be coaxially fitted around the lens barrel to conform with the outer periphery of the lens barrel. The manually-controlled means in this ease may be configured in such a manner that the positioning assistance means moves in the axial direction of the lens barrel through the rotation of the manually-controlled means.

The camera may further comprise illumination means that is adapted to illuminate at least the part of the object to be photographed when the objective lens is in the second range span. This illumination means ensures proper illumination in shooting a magnified image.

The illumination means may be a light source like a light bulb and an LED that emits light autonomously, or an edge surface of an optical fiber propagating the light from a predetermined light source to emit predetermined light components.

The illumination means may be provided at any position on the camera. For example, the illumination means may be disposed inside the lens barrel when the camera has lens barrel as described above.

For the camera having illumination means, the positioning assistance means may be as follows. The positioning assistance means may be configured to shut out the light and the part of the object to be photographed may be protected from the external light when the objective lens is in the second range span and when the positioning assistance means is abutted against the object. With such positioning assistance means, the light components to be used for image pickup are only those generated by the illumination means. This ensures uniformity of illumination. This is useful for cases where exact comparison of images is required that are photographed at different timing when magnified images are used for medical purposes.

For the camera having no illumination means or for the camera having illumination means which does not require to shoot magnified images under the exactly same illumination conditions, the positioning assistance means may be transparent to the light.

The above-mentioned camera may be obtained by means of attaching a unit for a camera as follows to the camera having the image pickup means contained in the housing.

The unit for a camera is the one that is integrally formed of: an objective lens through which the light from the object is directed to the image pickup means, the objective lens being movable along the optical axis of the light from the object at least between a first range span within which an image built up by the image pickup means is a demagnified image and a second range span within which an image built up by the image pickup means is a magnified image; and positioning assistance means adapted to be used with an end thereof abutted against the object when the objective lens is located in the second range span, the positioning assistance means contributing to maintaining the distance between the object and the objective lens within the extent to which a focal point of the objective lens falls on the part of the object to be photographed, the positioning assistance means being located outside the field of view of the objective lens in the first range span.

The unit for a camera may include the above-mentioned illumination means. A power supply for the illumination means may be, in this case, on the camera side. When the illumination means is achieved by optical fibers, a light source may be provided on or in the camera to generate the light to be directed into the optical fibers.

BEST MODES FOR CARRYING OUT THE INVENTION

Referring to the drawing, a preferred embodiment of the present invention is described below.

Figure 1:
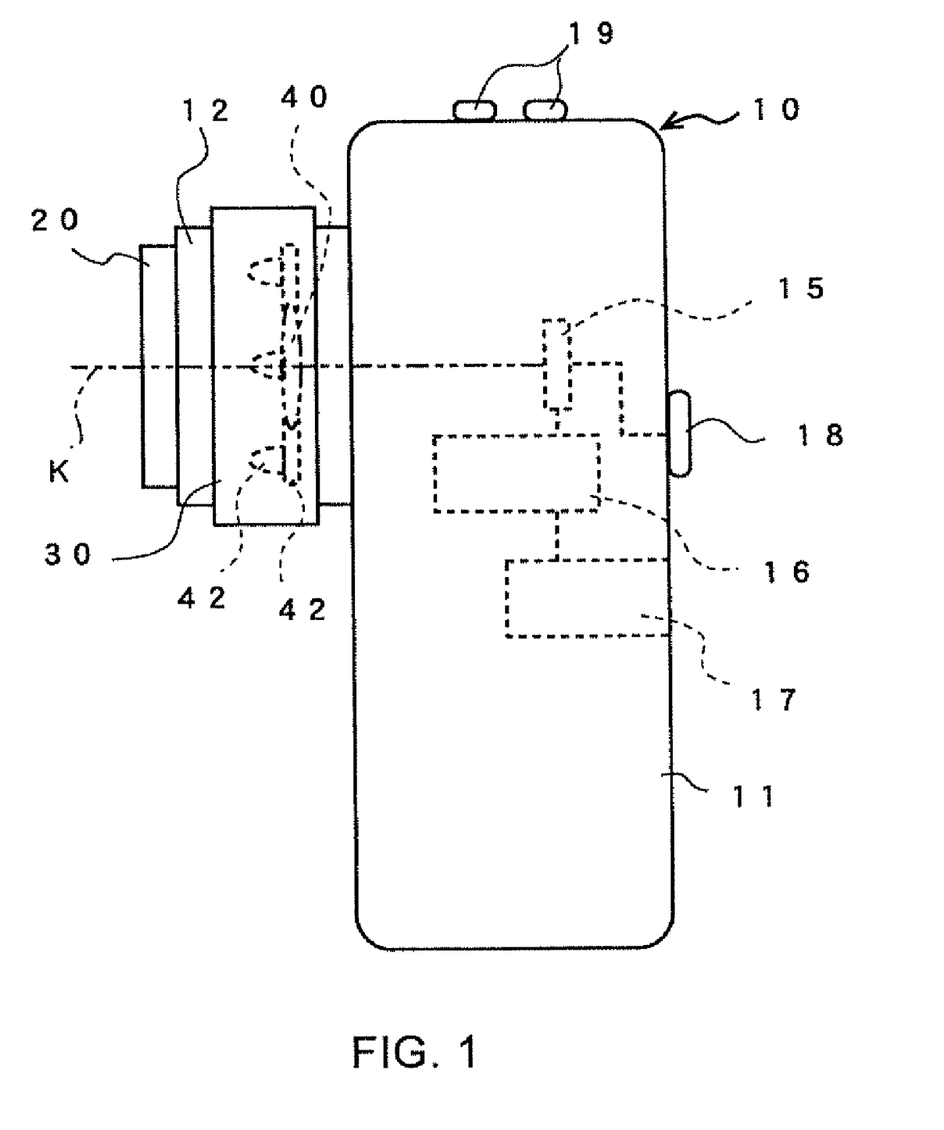
FIG. 1 is a perspective side view of a camera according to an embodiment of the present invention.
Figure 2:
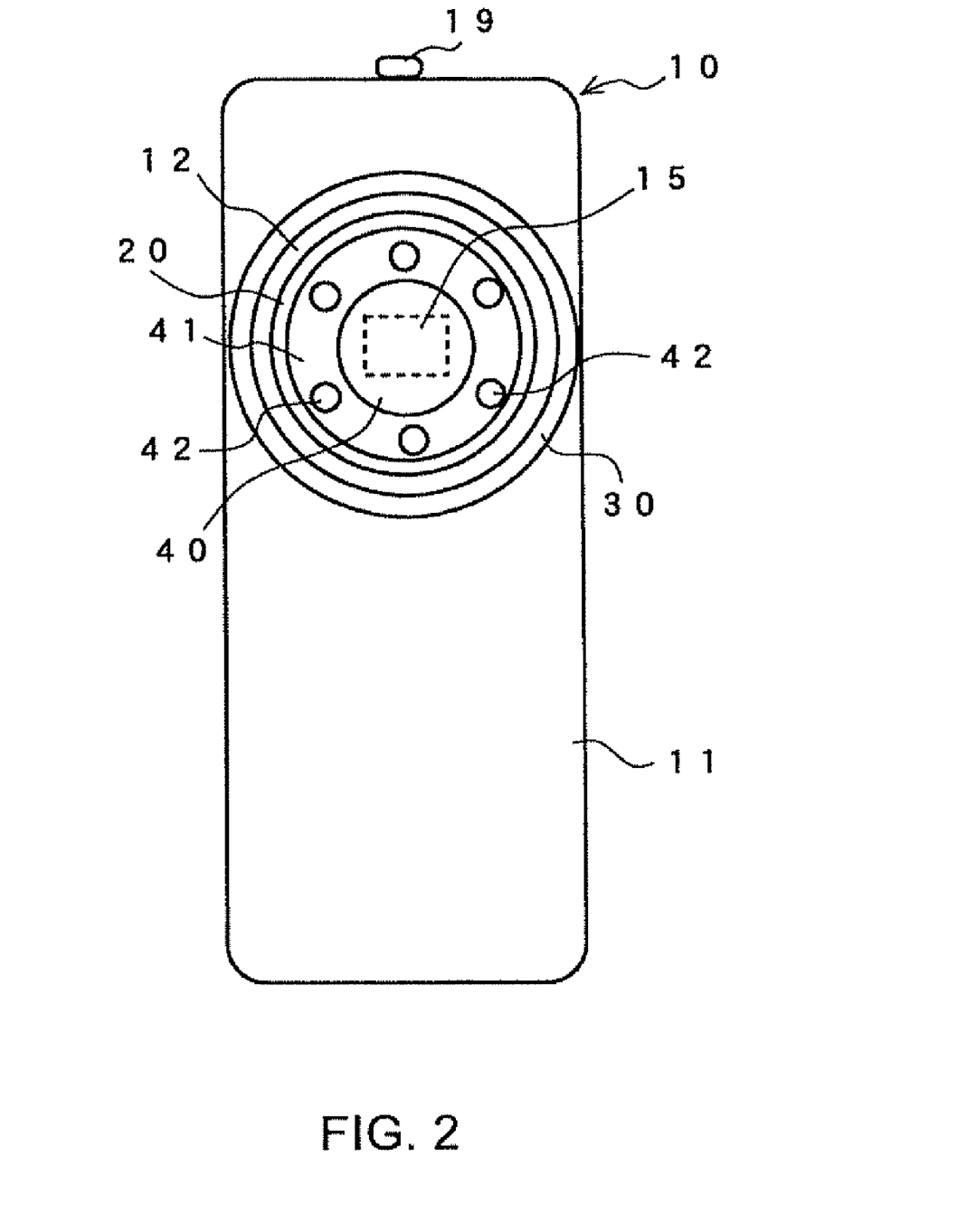
FIG. 2 is a front view of the camera shown in FIG. 1.

A camera according to this embodiment comprises a housing 10 to which various parts and components are fitted, as shown in the side view in FIG. 1 and the front view in FIG. 2.

The housing 10 of this embodiment comprises a generally rectangular parallelepiped housing body 11, and a hollow cylindrical lens barrel 12 that is projected from the front surface of the housing body 11. Both the housing body 11 and the lens barrel 12 of this embodiment are not transparent to the light. For example, they are made of an opaque material or colored with an opaque coating.

The housing body 11 extends downward (lower portion in FIGS. 1 and 2). This is made to offer a grip for easy holding with one hand.

An abutted member 20 that corresponds to the positioning assistance means of the present invention is provided inside the lens barrel 12. In addition, a manually-controlled member 30 that corresponds to the manually-controlled means of the present invention is fitted around the lens barrel 12. The abutted member 20 and the manually-controlled member 30 in this embodiment are both formed into a hollow cylindrical shape.

The abutted member 20 has the outside diameter which is generally equal to the inside diameter of the lens barrel 12. It is inserted into and engaged with the lens barrel 12 with almost no gap therebetween. The manually-controlled member 30 has the inside diameter which is generally equal to the outside diameter of the lens barrel 12. It is fitted around the lens barrel 12 with almost no gap therebetween. The lens barrel 12, the abutted member 20 and the manually-controlled member 30 in such relation are coaxial with each other. The axis which also is an optical axis K of the camera is shared among the lens barrel 12, the abutted member 20 and the manually-controlled member 30.

The manually-controlled member 30 is rotatable along the outer periphery of the lens barrel 12. The abutted member 20 moves back and forth in the direction of the optical axis K along with the rotation of the manually-controlled member 30. A mechanism of this will be described later.

The abutted member 20 has an objective lens 40 fitted therein. The objective lens 40 of this embodiment is formed of, but not limited to, a single convex lens. The objective lens 40 is fixed to the inner surface of the abutted member 20 through a mount 41 secured to the inside of the abutted member 20. The mount 41 is a disk plate having the outer diameter which is equal to the inner diameter of the abutted member 20 and having a round opening in it at the center thereof to which the objective lens 40 is engaged. The abutted member 20 of this embodiment is not transparent to the light. For example, it is made of an opaque material or is colored with an opaque coating.

Six light sources 42 are provided on the front surface of the mount 41. The light sources 42 are each achieved by, but not limited to, a small LED. The light sources 42 are turned on and off under the control of a controller which will be described later. More specifically, the light sources 42 are controlled so that it is supplied with electricity while the objective lens 40 is in the second range span (described later). It is disconnected from the power supply while the objective lens 40 is in other than that range span. Accordingly, at least the part of the object to be photographed is illuminated by the light from the light sources 42 when the objective lens 40 is in the second range span.

The housing body 11 contains a CCD 15, a controller 16 and a recording medium 17 in the camera according to this embodiment. In addition, the housing body 11 is provided with an output terminal 18 on the back surface thereof. The housing body 11 is also provided with a control dial 19 on the top surface thereof.

The CCD 15 corresponds to the image pickup means in the present invention. The light from the object that is guided from the object through the objective lens 40 along the optical axis K is directed to the CCD 15. In response to the light from the object, the CCD 15 builds up an image of the object using this light to create image data.

The controller 16 is for performing predetermined image processing on an image signal that is generated when the CCD 15 builds up a predetermined image. The controller 16 in the camera of this embodiment includes a computer, a ROM and a RAM. It is configured to provide the function to perform various processing by means of loading the program recorded on the ROM into the RAM and executing it. Details of the image processing that is carried out by the controller 16 by executing the program may be determined as needed. For example, the controller 16 may perform switching between a static image and a moving image or may perform adjustment of image quality including the adjustment of color, brightness, and contrast. Details of the processing that is carried out by the controller 16 is determined according to the information supplied from a user by controlling the above-mentioned control dial 19.

The recording medium 17 is for recording image data about an image that is built up. For example, it is formed of a RAM. More specifically, it may be formed of a well-known memory card or a memory stick. The recording medium 17 in this embodiment can be attached to and removed from the housing body 11, which is not an essential requirement.

The output terminal 18 serves as an interface for the external output of the image signal that is generated by the controller 16. For example, the output terminal 18 may be connected to a predetermined display via a cable to display a picked-up image on the display. The external output of the image signal may be achieved in a wireless manner by using, for example, infrared radiation.

The controller 16 controls, according to the information received through the control dial 19, whether the image signal about the picked up image is recorded on the recording medium 17, or is supplied outside through the output terminal 18, or both.

Next, a mechanism with which the abutted member 20 moves back and forth along the optical axis K along with the rotation of the manually-controlled member 30 is described with reference to FIG. 3.

Figure 3:
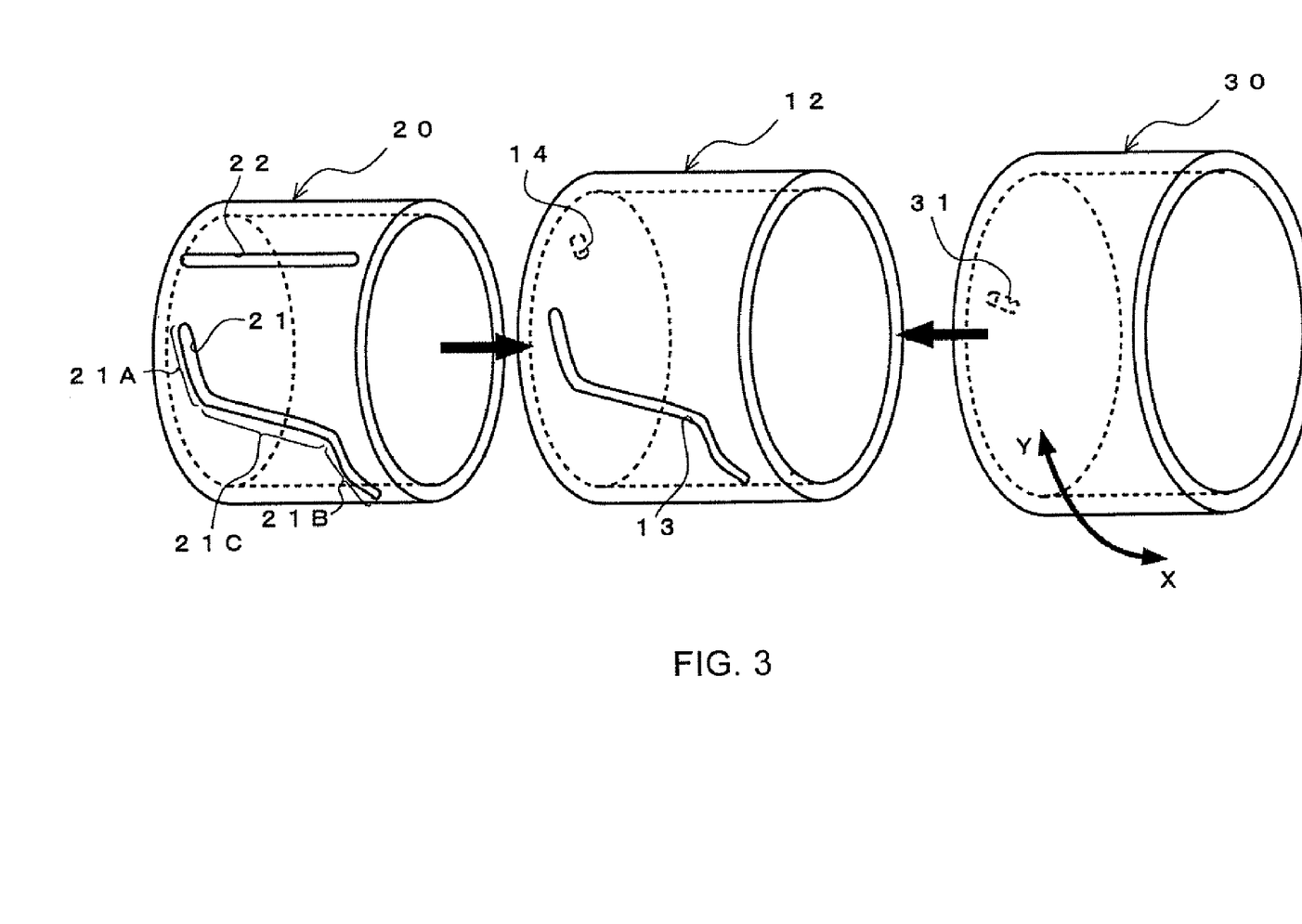
FIG. 3 is a view illustrating a structure of a lens barrel, an abutted member and a manually-controlled member in the camera shown in FIG. 1.

FIG. 3 is an exploded perspective view showing a structure of the lens barrel 12, the abutted member 20 and the manually-controlled member 30. The right side in the figure corresponds to the side of the housing body 11.

As shown, the abutted member 20 has a generally S-shaped first slit 21 and a straight second slit 22 that are penetrating through the abutted member 20. The first slit 21 comprises a first angled portion 21A and a second angled portion 21B at both ends of the slit through which the amount of shift in the axial direction is small when moved along the periphery, and a middle angled portion 21C through which the amount of shift in the axial direction when moved along the periphery is larger than in the case of the first angled portion 21A and the second angled portion 21B.

Next, the lens barrel 12 is described. The lens barrel 12 has a third slit 13 penetrating therethrough. The third slit 13 has a shape corresponding to the first slit 21 in the abutted member 20. The inner surface of the lens barrel 12 is provided with a first cam 14 that is formed into a solid cylindrical shape. The first cam 14 is attached to the inner surface of the lens barrel 12 at right angles. The length of it is equal to the thickness of the abutted member 20. The diameter of the first cam 14 corresponds to the width of the second slit 22 formed in the abutted member 20.

Next, the manually-controlled member 30 is described. A second cam 31 that is formed into a solid cylindrical shape is provided on the inner surface of the manually-controlled member 30. The second cam 31 is attached to the inner surface of the manually-controlled member 30 at right angles. The length of it is equal to the combined thickness of the lens barrel 12 and the abutted member 20. The diameter of the second cam 31 corresponds to the width of the first slit 21 formed in the abutted member 20 and the width of the third slit 13 formed in the lens barrel 12.

With the lens barrel 12, the abutted member 20 and the manually-controlled member 30 assembled together, the first cam 14 on the inner surface of the lens barrel 12 engages with the second slit 22 formed in the abutted member 20. Likewise, the second cam 31 on the inner surface of the manually-controlled member 30 passes through the third slit 13 formed in the lens barrel 12 and engages with the first slit 21 formed in the abutted member 20. The ends of the first cam 14 and the second cam 31 are aligned with the inner surface of the abutted member 20.

When the first cam 14 engaging with the second slit 22 is located at the leftmost end of the second slit 22 in the figure, the second cam 31 engaging with the first slit 21 is located at the leftmost end of the first slit 21 in the figure.

Because of this configuration, rotation of the manually-controlled member 30 causes the abutted member 20 to move back and forth in the direction of the optical axis K accordingly.

More specifically, when the manually-controlled member 30 is rotated in the direction depicted by the symbol X in the figure, the second cam 31 on the manually-controlled member 30 also rotates in the direction depicted by the symbol X in the figure. The abutted member 20 having the first slit 21 engaging with the second cam 31 begins to rotate along with the rotation of the second cam 31. This rotation is, however, hindered due to the first cam 14 engaging with the second slit 22 formed on the abutted member 20. Accordingly, the abutted member 20 moves in a straight line to the left in the figure.

On the other hand, when the manually-controlled member 30 is rotated in the direction depicted by the symbol Y in the figure, an exact opposite to the above occurs. That is, when the manually-controlled member 30 is rotated in the direction depicted by the symbol Y in the figure, the abutted member 20 moves in a straight line to the right in the figure.

With the mechanism as described above, rotation of the manually-controlled member 30 results in straight movement of the abutted member 20 in the direction of the optical axis K. In response to the movement of the abutted member 20 in the direction of the optical axis K, the objective lens 40 inside the abutted member 20 also moves in the direction of the optical axis K.

As described above, the first slit 21 comprises the first angled portion 21A, the second angled portion 21B and the middle angled portion 21C. If the manually-controlled member 30 is completely rotated in the direction depicted by the symbol Y in the figure or if it is almost completely rotated, the second cam 31 comes to the position of the above-mentioned first angled portion 21A. At this state, the objective lens 40 is closer to the CCD 15. An image produced on the CCD 15 at this state is a demagnified image.

On the other hand, if the manually-controlled member 30 is completely rotated in the direction depicted by the symbol X in the figure or if it is almost completely rotated, the second cam 31 comes to the position of the above-mentioned second angled portion 21B. At this state, the objective lens 40 is away from the CCD 15 as compared with the case when the second cam 31 is located at the first angled portion 21A. An image produced on the CCD 15 at this state is a magnified image.

As may be apparent from the above, in this embodiment, the objective lens 40 moves to a position suited to shoot a demagnified image when the second cam 31 comes to the position of the first angled portion 21A. The objective lens 40 moves to a position suited to shoot a magnified image when the second cam 31 comes to the position of the second angled portion 21B. In other words, in the camera according to this embodiment, the position of the objective lens 40 while the second cam 31 is located at the first angled portion 21A corresponds to the first range span of the present invention. The position of the objective lens 40 while the second cam 31 is located at the second angled portion 21B corresponds to the second range span of the present invention.

In the first angled portion 21A, the second angled portion 21B and the middle angled portion 21C, the amount of shift of the abutted member 20 in the axial direction when moved along the periphery is larger in the middle angled portion 21C than in the first angled portion 21A and the second angled portion 21B. This means that the amount of movement of the abutted member 20 is larger when the second cam 31 is located at the middle angled portion 21 than when the second cam 31 is located at the first angled portion 21A or the second angled portion 21B, provided that the manually-controlled member 30 is rotated at the same angle.

In the camera of this embodiment, the amount of movement of the objective lens 40 as a result of the movement of the manually-controlled member 30 by a given amount is smaller the objective lens 40 in the first range span and the second range span than when it is out of the first range span and the second range span. Because of this configuration, precise positioning of the objective lens (which positioning is made mainly for focusing) can be made more easily in the first range span and the second range span in which an image is to be photographed using this camera.

In the camera according to this embodiment, the abutted member 20 moves to the right in FIG. 3 until it is contained in the lens barrel 12 when the second cam 31 is located at the first angled portion 21A of the first slit 21, that is, when the objective lens 40 is in the first range span suitable for shooting a demagnified image.

In this camera, the abutted member 20 extends out of the lens barrel 12 when the second cam 31 is located at the second angled portion 21B of the first slit 21, that is, when the objective lens 40 is in the second range span suitable for shooting a magnified image.

The length of the part of the abutted member 20 extended is the one that the center of the circle formed by the end of the abutted member 20 is within the range on which the objective lens 40 in the second range span can be focused. In the camera of this example, when the end of the abutted member 20 is abutted against the object in shooting a magnified image, the focal point of the objective lens 40 falls on the center of the circle formed by the end of the abutted member 20.

A larger focal depth of the objective lens 40 on the object side may be used in order to eliminate strict requirements for precise focusing. To this end, an aperture may be provided between the objective lens 40 and the CCD 15 for example.

The abutted member 20 in the camera according to this embodiment has the inner diameter that prevent it from appearing in the field of view of the objective lens 40 when the objective lens 40 is in either the first range span or the second range span. The objective lens 40 in the first range span is retracted toward the CCD 15 as described above. Accordingly, there is a higher possibility of the abutted member 20 located in front of it appearing in the field of view. However, the abutted member 20 is contained in the lens barrel 12 as described above while the objective lens 40 is in the second range span. This makes it difficult for the abutted member 20 to appear in the field of view of the objective lens 40, avoiding the necessity of increasing the size of the inner diameter of the abutted member 20 unnecessarily.

Next, the way of using this camera is described.

A user first determines whether he or she wants to shoot a demagnified image or a magnified image using this camera.

The camera is available for both moving images and static images. Accordingly, the user should also determine whether he or she shoots a moving image or a static image. It is also necessary to determine whether image quality should be adjusted. The user supplies the information associated with such determination to the camera by controlling the control dial 19 during or prior to shooting an image.

In order to shoot a demagnified image, the user rotates the manually-controlled member 30 in the direction depicted by the symbol Y in FIG. 3. This causes the objective lens 40 to move to the first range span that is closer to the CCD 15. Image pickup that is carried out in this state is for shooting a demagnified image. The abutted member 20 in this state is contained in the lens barrel 12 as described above.

Images are photographed by the user after he or she turns the lens barrel 12 toward the object. The light from the object is then directed to the CCD 15 through the objective lens 40. The CCD 15 builds up a demagnified image using this light.

The user may rotate the manually-controlled member 30 if necessary while keeping the objective lens 40 in the first range span. This causes the objective lens 40 to move back and forth relative to the CCD 15, adjusting the focus to shoot a demagnified image.

The image data created by the CCD 15 are subjected to proper processing by the controller 16 according to the operation that the user made using the control dial 19. The image data are recorded on the recording medium 17 or are supplied outside via the output terminal 18, according to the information supplied by the user through the operation of the control dial 19.

This is how the demagnified image is photographed.

On the other hand, in order to shoot a magnified image, the user rotates the manually-controlled member 30 in the direction depicted by the symbol X in FIG. 3. This causes the objective lens 40 to move and reach the second range span that is relatively far from the CCD 15. The camera is then ready for shooting a magnified image. In this state, the abutted member 20 extends out of the lens barrel 12. The light sources 42 are supplied with electricity.

In this state, the user abuts the end of the abutted member 20 against the object so that the part of the object to be photographed comes to the center of the circle formed by end of the abutted member 20. The center of the circle formed by the end of the abutted member 20 is in the region on which the objective lens 40 in the second range span can be focused. Accordingly, an image of the object can automatically be made in focus merely by positioning the part of the object to be photographed at the center of the circle formed by the end of the abutted member 20. The image pickup can be made with the abutted member 20 abutted against the object, surrounding the area to be photographed. Thus, the image can be photographed using a steady camera with no problem of camera shake.

During the image pickup, the illuminated light from the above-mentioned light sources 42 is directed to at least the area to be photographed. Therefore, illuminance required for shooting an image can be obtained without using any other lighting equipment.

If the user feels that an image of the area to be photographed is not taken well, he or she moves the camera while preferably keeping the abutted member 20 abutted against the object. The user may rotate the manually-controlled member 30 if necessary while keeping the objective lens 40 in the second range span. This allows the user to adjust focusing for shooting a magnified image.

In response to the light from the object guided to the CCD 15 through the objective lens 40 in the manner described above, the CCD 15 builds up a magnified image.

The image data created by the CCD 15 are subjected to necessary processing by the controller 16 according to the operation that the user made using the control dial 19. The image data are recorded on the recording medium 17 or are supplied outside via the output terminal 18, according to the information supplied by the user through the operation of the control dial 19.

This is how the magnified image is photographed.

A modified version of the above-mentioned camera is described.

In the above-mentioned camera, the abutted member 20 is secured to the objective lens 40 via the mount 41. The abutted member 20 and the objective lens 40 are moved in a linear relation. However, it is not essential for the abutted member 20 and the objective lens 40 to be moved in a linear relation. Instead, they may be moved independently such that at least one of the abutted member 20 and the objective lens 40 may be moved appropriately by using, for example, motor power.

In the above-mentioned camera, the objective lens 40 is the only component that moves within an optical system. The objective lens 40 is only required to move to satisfy the following equation between the object and the CCD 15: $(1/a)+(1/b)=(1/f)$ (wherein "a" represents the distance between the object and the objective lens 40, "b" represents the distance between the objective lens 40 and the CCD 15, and "f" represents the focal distance of the objective lens 40). Accordingly, such a configuration may be employed to allow the movement of not only the objective lens 40 but also the CCD 15, provided that this condition is satisfied or it is more reasonable to move the CCD 15 to satisfy this condition. The movement of the CCD 15 in this state may be made manually using a mechanical mechanism or may be made using predetermined power.

Figure 4:
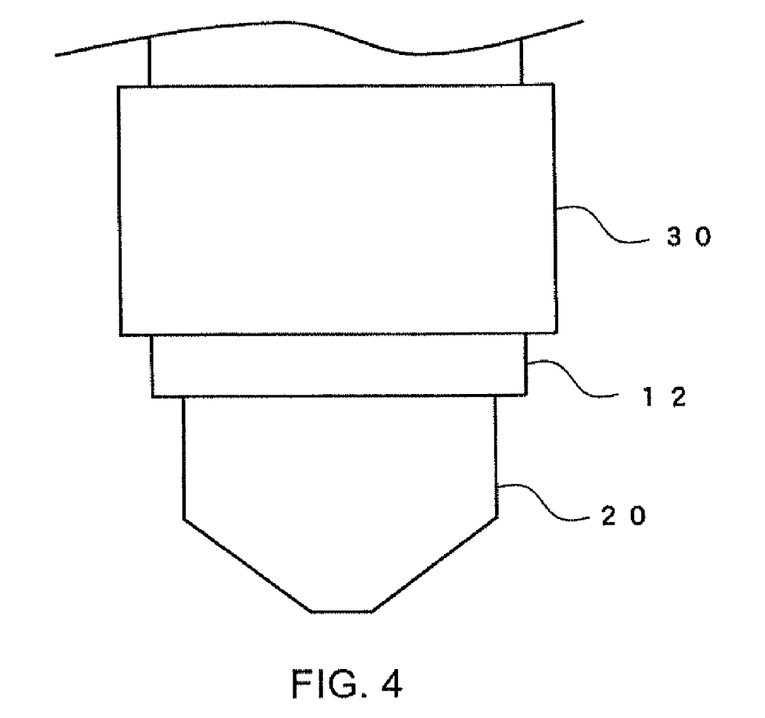
FIG. 4 is a side view illustrating a modification of the abutted member in the camera shown in FIG. 1.
Figure 5:
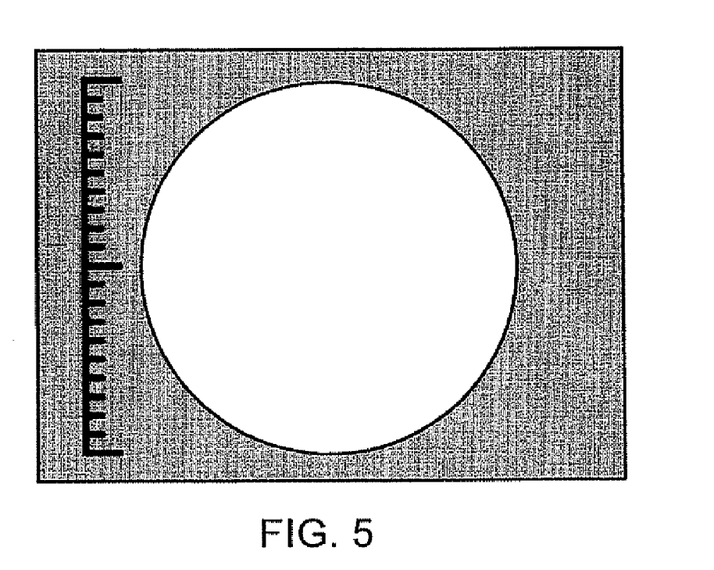
FIG. 5 is a view illustrating an example of an image that is photographed with the camera having the abutted member shown in FIG. 4.

While the above-mentioned camera has a hollow cylindrical abutted member 20, the shape of the abutted member 20 may be modified as, for example, a cone as shown in FIG. 4. When the abutted member 20 is tapered at the end thereof, the diameter of the opening formed in the end may have a size with which the inner edge of the abutted member 20 overlaps the outer periphery of the part of the object to be photographed while the objective lens 40 is in the second range span. A scale which is not shown may be provided with predetermined readings on the inner surface of the end of the abutted member 20. The scale serves as an indication with which the user can find out an approximate size of the object by comparing the scale with the part of the object to be photographed in a subject. It corresponds to the reference means of the present invention. An example of an image photographed with the camera having the abutted member 20 in this example is shown in FIG. 5. In FIG. 5, a hatched portion corresponds to the inside of the abutted member 20 and those indicated on the left of the hatched portion in FIG. 5 are readings.

The objective lens 40, the abutted member 20, the manually-controlled member 30, the light sources 42 and the mount 41 in the above-mentioned example may freely be attached to and removed from the housing body 11. A combination of them with the lens barrel 12 may freely be attached to and removed from the housing body 11. They may be integrally formed as a whole. The objective lens 40, the abutted member 20, the manually-controlled member 30, the light sources 42 and the mount 41 (as a case may be, along with the lens barrel 12) may be integrally formed as a unit. Such a unit may be attached to the camera body for use as though a typical magnification lens unit were used that comprises a lens contained in a lens barrel. In this way, it may be used with an ordinary camera as an attachment, which is advantageous for users in terms of ease of use.

INDUSTRIAL APPLICABILITY

As apparent from the above, the present invention provides a camera that is suited for shooting both demagnified images and magnified images.

What is claimed is:

1. A camera comprising an objective lens; image pickup means for building up an image using the light from an object, the light from the object being adapted to be directed to the image pickup means through said objective lens; and a housing for holding them in, wherein:

said objective lens is movable along the optical axis of said light from the object at least between a first range span within which an image built up by the image pickup means is a demagnified image and a second range span within which an image built up by the image pickup means is a magnified image; and that the camera further comprises positioning assistance means adapted to be used with an end thereof abutted against said object when said objective lens is located in said second range span, the positioning assistance means contributing to maintaining the distance between said object and said objective lens within the extent to which a focal point of said objective lens falls on the part of said object to be photographed, the positioning assistance means being fitted to said housing in such a manner that the positioning assistance means is located outside the field of view of the objective lens in said first range span;

wherein said objective lens is fitted to said positioning assistance means and said positioning assistance means is movable in the direction of said optical axis.

2. The camera as claimed in claim 1, wherein said positioning assistance means is adapted to position said objective lens with respect to the distance from said object so that the distance between the object and said objective lens is fixed when the end of the positioning assistance means is brought into contact with a planar object.

3. The camera as claimed in claim 1, wherein said positioning assistance means is located outside the field of view of the objective lens and the end of the positioning assistance means is abutted to a point out of the area corresponding to the part of the object to be photographed when said objective lens is in said second range span.

4. The camera as claimed in claim 1, wherein said positioning assistance means is located at different positions when said objective lens is in said first range span and when it is in said second range span.

5. The camera as claimed in claim 1, wherein said positioning assistance means is adapted to move in parallel to said housing.

6. The camera as claimed in claim 1, wherein said objective lens is movable along said optical axis over a range of at least one of said first range span and said second range span.

7. The camera as claimed in claim 1, further comprising a manually-controlled member that is movable from a first position to a second position to correspondingly move said objective lens from said first range span to said second range span, in which the amount of movement of said objective lens in response to the movement of said manually-controlled member is smaller when said objective lens is inside said first range span and said second range span than when it is outside said first range span and said second range span.

8. The camera as claimed in claim 1, wherein said positioning assistance means is tubular in shape and is movable in the axial direction of the tubular shape, and said objective lens is fixed to and contained inside the tubular positioning assistance means.

9. The camera as claimed in claim 8, further comprising a lens barrel that is provided with manually-controlled means which is tubular in shape, the manually-controlled means being coaxially fitted around said lens barrel in such a manner that said positioning assistance means moves in the axial direction of said lens barrel through the rotation of the manually-controlled means.

10. The camera as claimed in claim 1, further comprising illumination means that is adapted to illuminate at least the part of the object to be photographed when said objective lens is in said second range span.

11. The camera as claimed in claim 10, wherein said positioning assistance means blocks external light and is configured to protect the part of the object to be photographed from external light when said objective lens is in said second range span and when the end of the positioning assistance means is abutted against the object.

12. The camera as claimed in claim 10, wherein said illumination means is disposed inside said lens barrel.

13. The camera as claimed in claim 1, wherein said positioning assistance means is transparent to the light.

14. A camera comprising an objective lens; and image pickup means for building up an image using the light from an object, the light from the object being adapted to be directed to the image pickup means through said objective lens, wherein:

said objective lens is movable along the optical axis of said light from the object at least between a first range span within which an image built up by the image pickup means is a demagnified image and a second range span within which an image built up by the image pickup means is a magnified image; and that the camera farther comprises positioning assistance means adapted to be used with an end thereof abutted against said object when said objective lens is located in said second range span, the positioning assistance means contributing to maintaining the distance between said object and said objective lens within the extent to which a focal point of said objective lens falls on the part of said object to be photographed, the positioning assistance means being located outside the field of view of the objective lens in said first range span;

wherein said objective lens is fitted to said positioning assistance means and said positioning assistance means is movable in the direction of said optical axis.

15. A unit for a camera for use in a camera comprising a housing and image pickup means contained therein, wherein:

the unit is integrally formed of:

an objective lens through which the light from the object is directed to said image pickup means, the objective lens being movable along the optical axis of said light from the object at least between a first range span within which an image built up by the image pickup means is a demagnified image and a second range span within which an image built up by the image pickup means is a magnified image; and positioning assistance means adapted to be used with an end thereof abutted against said object when said objective lens is located in said second range span, the positioning assistance means contributing to maintaining the distance between said object and said objective lens within the extent to which a focal point of said objective lens falls on the part of said object to be photographed, the positioning assistance means being located outside the field of view of the objective lens in said first range span;

wherein said objective lens is fitted to said positioning assistance means and said positioning assistance means is movable in the direction of said optical axis.

* * * * *